United States Patent
Saito et al.

(12) 
(10) Patent No.: US 6,380,318 B1
(45) Date of Patent: Apr. 30, 2002

(54) PROCESS FOR PRODUCING MODIFIED ACRYLIC RUBBER

(75) Inventors: Kuniyoshi Saito, Iwaki; Eiji Komiya, Fujisawa; Jun Okabe, Kitaibaraki, all of (JP)

(73) Assignee: Nippon Mektron, Limited (JP)

( * ) Notice: Subject to any disclaimer, the term of this patent is extended or adjusted under 35 U.S.C. 154(b) by 0 days.

(21) Appl. No.: 09/095,992

(22) Filed: Jun. 11, 1998

(30) Foreign Application Priority Data

Jul. 25, 1997 (JP) ............................................. 9-215936

(51) Int. Cl.⁷ ............................................. C08S 265/10
(52) U.S. Cl. ........................................ 525/282; 525/292
(58) Field of Search ................................. 525/282, 292

(56) References Cited

U.S. PATENT DOCUMENTS

| | | | |
|---|---|---|---|
| 4,092,303 A | * 5/1978 | Behrens | ........................ 525/292 |
| 4,216,302 A | 8/1980 | Skillicorn | |
| 5,260,356 A | 11/1993 | Craun et al. | |

FOREIGN PATENT DOCUMENTS

| | | |
|---|---|---|
| DE | 37 11 791 A1 | 10/1987 |
| DE | 37 10 343 A1 | 10/1988 |
| EP | 0 273 795 A2 | 7/1988 |
| EP | 0 288 865 A2 | 11/1988 |
| EP | 0 485 990 A2 | 5/1992 |
| GB | 2 219 591 A | 12/1989 |
| JP | 49-87787 | 8/1974 |
| JP | A-3-221513 | 9/1991 |
| JP | 05 214196 | 8/1993 |
| JP | A-5-214196 | 8/1993 |
| JP | 05 247120 A | 9/1993 |

OTHER PUBLICATIONS

Database WPI Section Ch, Week 8910 Derwent Publications Ltd., London, GB; AN 89–071698 XP–002083161 & JP 01 022902 A(Japan Synthetic Rubber Co., Ltd.) Jan. 25, 1989 *Abstract *.

Chemical Abstracts, vol. 100, No. 14, Apr. 1984, Columbus, Ohio, US; abstract No. 104883q p. 71; col. 2; XP002083159 *abstract* & SU 1 060 622 A (Leningrad Technological Institute) Dec. 15, 1983.

Chemical Abstracts, vol. 108, No. 6, Feb. 1988, Columbus, Ohio, US; abstract No. 38667j, p. 17, col. 2; XP002083160 *abstract* JP 62 116612 A (Mitsubishi Petrochemical Co., Ltd.) May 28, 1987.

* cited by examiner

*Primary Examiner*—Bernard Lipman
(74) *Attorney, Agent, or Firm*—Baker & Daniels

(57) ABSTRACT

A modified acrylic rubber having distinguished molding characteristics and O-ring compression set characteristic is produced by mixing an acrylic rubber having reactive functional groups such as active chlorine groups, carboxylic groups, epoxy groups, active ester groups, etc. with an unsaturated compound reactive with the reactive functional group with heating in the absence of a solvent.

6 Claims, No Drawings

PROCESS FOR PRODUCING MODIFIED ACRYLIC RUBBER

BACKGROUND OF THE INVENTION

1. Field of the Invention

The present invention relates to a process for producing a modified acrylic rubber and more particularity to a process for producing a peroxide-crosslinkable, modified acrylic rubber.

2. Description of Related Art

Acrylic rubbers are widely used as molding materials for hoses, various seal materials, etc. due to its relative low production cost as well as good heat resistance and oil resistance, but requirements for its higher functionability and lower production cost are still now in increasing demand.

For lower production cost, it is highly desired to shorten the processing time and molding time of crosslinkable compositions, and various attempts have been so far made for that purpose. Attempts to increase the crosslinking speed, which relates to the shortening of molding time, inevidently deteriorates the scorch resistance and thus a more practical, stable crosslinking systems are in keen demand.

Systems capable of satisfying both high speed crosslinkability and scorch resistance at the same time include a peroxide-based crosslinking system, which has been so far widely studied but still has problems.

(1) A process for copolymerizing dienes, for example, 5-alkylidene-2-norbornene, etc. to introduce crosslinkable unsaturated groups into side chains (JP-A-49-87787) has such a disadvantage as poor processability, etc. of the product due to interreaction of the crosslinkable unsaturated groups during the copolymerization reaction to cause intermolecular bridging.

(2) A process for crosslinking reaction between the side chains of alkoxyalkyl acrylate in the acrylic copolymers and a bismaleimide compound used as a crosslinking aid (JP-A-5-214196) has such a disadvantage as poor compression set when subjected to vulcanization molding into O-rings.

(3) Acrylic rubber containing iodine or bromine as crosslinking sites can be crosslinked with a peroxide, but the iodine- or bromine-containing, crosslinkable monomers to be introduced into copolymers are generally expensive with failure to satisfy the requirements for lower production cost.

(4) A process for graft polymerization of monomers having a polymerizable, unsaturated group can be used as a procedure for introducing crosslinkable unsaturated groups (JP-A-3-221513), but use of an organic solvent in the reaction is with failure to satisfy the requirements for lower cost.

SUMMARY OF THE INVENTION

An object of the present invention is to provide a process for producing a modified acrylic rubber in the absence of a solvent, the modified acrylic rubber so produced being distinguished in the molding charactertics and O-ring compression set.

The object of the present invention can be attained by a process for producing a modified acrylic rubber, which comprises mixing an acrylic rubber having reactive functional groups with an unsaturated compound reactive with the reactive functional group with heating in the absence of a solvent.

DETAILED DESCRIPTION OF THE INVENTION

An acrylic rubber having reactive groups for use in the present invention includes, for example, acrylic copolymers obtained by copolymerizing at least one of alkyl acrylate and alkoxyalkyl acrylate as the main component with about 0.5 to about 10% by weight, preferably about 1% to about 8% by weight, on the basis of the acrylic copolymer, of a monomer having an active chlorine group, a carboxyl group, an epoxy group, an active ester group or the like.

Alkyl acrylate for use in the present invention includes, for example, alkyl acrylates having an alkyl group with 1 to 8 carbon atoms (the alkyl group may further having a substituent such as a cyano group, etc.) such as methyl acrylate, ethyl acrylate, n- or iso-propyl acrylate, n- or iso-butyl acrylate, n-amyl acrylate, n-hexyl acrylate, 2-ethylhexyl acrylate, n-octyl acrylate, 2-cyanoethyl acrylate, etc., preferably ethyl acrylate and n-butyl acrylate, and further methyl methacrylate, ethyl methacrylate and n-butyl methacrylate.

Alkoxyalkyl acrylate for use in the present invention includes, for example, alkoxyalkyl (meth)acrylates having an alkoxyalkyl group with 2 to 8 carbon atoms such as methoxymethyl acrylate, ethoxymethyl acrylate, 2-methoxyethyl acrylate, 2-ethoxyethyl acrylate, 2-butoxyethyl acrylate, and the corresponding mathacrylates, etc., preferably 2-methoxyethyl acrylate and 2-ethoxyethyl acrylate.

At least one of these alkyl acrylates and alkoxyalkyl acrylates can be used in a proportion of 99 to 50% by weight, preferably 98 to 70% by weight, as the main component of the acrylic copolymer, and both alkyl acrylate and alkoxyalkyl acrylate, when used together, can be generally in a ratio of the former to the latter of about 90 to about 10: about 10 to about 90% by mole.

A portions particularly up to about 20% by weight of the acrylic copolymer can be replaced with other copolymerizable monomer, followed by copolymerization of the resulting mixture. Such other copolymerizable monomer includes, for example, ethylene, propylene, vinyl chloride, vinylidene chloride, acrylonitrile, styrene, vinyl acetate, ethyl vinyl ether, butyl vinyl ether, alkyl methacrylate, alkoxyalkyl methacrylate, etc.

Monomers (vinyl monomers) having a reactive functional group, which are to be copolymerized with the main component into the acrylic rubber include, for example, monomers having an active chlorine group, a carboxyl group, an epoxy group, an active ester group, etc.

The monomers having an active chlorine group include, for example, 2-chloroethyl vinyl ether, 2-chloroethyl acrylate, vinyl monochloroacetate, chloromethylstyrene, etc. The monomers having a carboxyl group include, for example, (meth)acrylic acid, maleic acid, fumaric acid, itaconic acid, maleic acid monoester, fumaric acid monoester, etc. The monomers having an epoxy group include, for example, allyl glycidyl ether, glycidyl vinyl ether, glycidyl (meth)acrylate, (meth)acrylates containing an alicyclic epoxy group, etc. The monomers having an active ester group include, for example, (meth)acrylates having a phenyl group such as phenyl (meth)acrylate, cyanophenyl (meth)acrylate, nitrophenyl (meth)acrylate, etc.

Unsaturated compounds reactive with the reactive functional group originating from these monomers copolymerized into the acrylic copolymer include the following compounds.

Unsaturated compounds reactive with the active chlorine group include, besides the above-mentioned monomers having a carboxyl group, such unsaturated compounds having a carboxyl group as:

CH$_2$=CRCOOR$^1$(OCOR$^2$)nCOOH,

CH$_2$=CRCOOR$^1$OCOPhCOOH, where R represents a hydrogen atom or a methyl group; R$^1$ and R$^2$ each represent an alkylene group having 1 to 6 carbon atoms; Ph represents a phenylene group; and n is an integer of 1 to 6, vinyl acetic acid, 2-(meth)acryloyloxyethyl succinate, 2-(meth)acryloyloxyoxyethyl phthalate, 2-(meth)acryloyloxyethyl hexahydrophthalate; and,

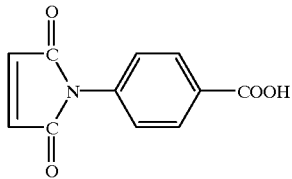

(PAB-MI, trademark of a product from Mitsui Chemical Corporation, Japan).

Reaction of the unsaturated compound with the acrylic copolymer having active chlorine groups can be carried out in the presence of such an acid acceptor as calcium hydroxide, magnesium hydroxide, synthetic hydrotalcite, sodium stearate, potassium stearate, sodium 2-ethylhexanoate, etc. and typically such a quaternary onium salt as benzyltriphenylphosphonium chloride, tetrabutylammonium bromide, etc. Furthermore, unsaturated compounds containing a thiol group such as allylmercaptan, etc. can be used and also subjected to the reaction in the presence of an acid acceptor and a quaternary onium salt.

Unsaturated compounds reactive with the carboxyl group of the acrylic copolymer having carboxyl groups include, for example, unsaturated compounds having a primary amino group such as allylamine, aminostyrene, aminomethylstyrene, p-aminophenylene maleimide, etc. Reaction of the unsaturated compound with the acrylic copolymer having a carboxyl group can be carried out in the presence of a strongly basic compound such as guanidine, etc.

Unsaturated compounds reactive with the epoxy group of the acrylic copolymer include, for example, the above-mentioned monomers having an active ester group. Reaction of the unsaturated compound with the epoxy group of the acrylic copolymer having epoxy groups can be carried out in the presence of a quaternary onium salt. Furthermore, the above-mentioned unsaturated compounds having a primary amino group or a carboxyl group can be also used.

Unsaturated compounds reactive with the active ester group of acrylic copolymer having active ester groups include, for example, the above-mentioned monomers having an epoxy group. Reaction of the unsaturated compound with the active ester group of the acrylic copolymer having active ester groups can be carried out in the presence of a quaternary onium salt.

At least one of ammonium salts and phosphonium salts, represented by the following formulae, respectively, can be used as a quaternary onium salt serving as a catalyst for most of the above-mentioned reactions:

$(R_1R_2R_3R_4N)^+X^-$ and $(R_1R_2R_3R_4P)^+X^-$ wherein $R_1$ to $R_4$ each represent an alkyl group, an alkoxy group, an aryl group, an alkylaryl group, an aralkyl group or a polyoxyalkylene group, having 1 to 25 carbon atoms, respectively, 2 or 3 of whose groups may form a heterocyclic structure together with P or N; X$^-$ represents an anion such as Cl$^-$, Br$^-$, I$^-$, HSO$_4^-$, H$_2$PO$_4^-$, RCOO$^-$, ROSO$_2^-$, RSO$^-$, ROPO$_2$H$^-$, CO$_3^{--}$, etc.

Specifically, they include such quaternary ammonium salts as tetraethylammonium bromide, tetrabutylammonium chloride, tetrabutylammonium bromide, tetrabutylammonium iodide, n-dodecyltrimethylammonium bromide, cetyldimethylbenzylammonium chloride, methylcetyldibenzylammonium bromide, cetyldimethyl-ethylammonium bromide, octadecyltrimethylammonium bromide; cetylpyridinium chloride, cetylpyridinium bromide, cetylpyridinium iodide, cetylpyridinium sulfate, 1-benzylpyridinium chloride, 1-benzyl-3,5-dimethylpyridinium chloride, 1-benzyl-4-phenylpyridinium chloride, 1,4-dibenzylpyridinium chloride, 1-benzyl-4-(pyrrolidinyl) pyridinium chloride, 1-benzyl-4-pyridinopyridinium chloride; tetraethylammonium acetate, trimethylbenzylammonium benzoate, trimethylbenzylammonium p-toluenesulfonate, trimethylbenzylammonium borate, 8-benzyl-1,8-diazabicyclo[5.4.0]-undec-7-enium chloride, 1,8-diazabicyclo[5.4.0]-undecene-7-methylammonium methosulfate, 5-benzyl-1,5-diazabicyclo [4.3.0]-5-nonenium chloride, 5-benzyl-1,5-diaza-bicyclo [4.3.0]-5-nonenium bromide, 5-benzyl-1,5-diazabicyclo [4.3.0]-5-nonenium tetrafluoroborate, 5-benzyl-1,5-diazabicyclo[4.3.0]-5-nonenium hexafluorophosphate, etc.; and such quaternary phosphonium salts as tetraphenylphosphonium chloride, triphenylbenzylphosphonium chloride, triphenylbenzylphosphonium bromide, triphenylmethoxymethylphosphonium chloride, triphenylmethyl-carbonylmethylphosphonium chloride, triphenylethoxycarbonyl-methylphosphonium chloride, trioctylbenzylphosphonium chloride, trioctylmethylphosphonium bromide, trioctylethylphosphonium acetate, trioctylethylphosphonium dimethylphosphate, tetraoctylphosphonium chloride, cetyldimethylbenzylphosphonium chloride, etc.

These quaternary onium salts or guanidine or the like can be used in a proportion of about 0.05 to about 20 parts by weight, preferably about 0.1 to about 10 parts by weight, per 100 parts by weight of the acrylic rubber.

Reaction of the acrylic rubber having reactive functional groups with the unsaturated compound reactive with the reactive functional group in the presence of such a catalyst can be carried out by mixing these two reactants with heating in absence of a solvent.

The mixing with heating can be carried out by kneading at a temperature of about 50° to about 200° C., preferably about 80° to about 150° C. for about 1 to about 10 minutes with an open roll, an enclosed kneader, an extruder, etc., because of the reaction in the absence of a solvent. Actually, the acrylic rubber having reactive functional groups is charged into or wound up at a kneader preheated to such a temperature and subjected to conduct mastication for about one minute, and then the unsaturated compound and the catalyst are added thereto and subjected to intimate kneading, where a polymerization inhibitor such as hydroquinone, methoquinone, phenothiazine, etc., or an antioxidant such as hindered phenol, tertiary amine, etc can be appropriately added thereto, if required, to protect the unsaturated groups.

The resulting modified acrylic rubber is made susceptible to peroxide crosslinking by adding about 0.1 to about 10 parts by weight, preferably about 1 to about 5 parts by weight of an organic peroxide as a crosslinking agent per 100 parts by weight of the modified acrylic rubber to form a crosslinkable composition. The crosslinkable composition can appropriately further contain a filler or a reinforcing agent such as carbon black, silica, etc., a crosslinking aid such as triallyl isocyanurate, trimethylolpropane trimethacrylate, etc. and other necessary additives. The modified acrylic rubber can be crosslinked with other crosslinking agents than the organic peroxide, such as sulfur, polyol, etc.

The crosslinkable composition can be prepared by kneading the modified acrylic rubber, the crosslinking agent, the filler, etc. with an open roll, an enclosed kneader, etc. and can be press vulcanized at a temperature of about 150° to about 200° C. for about 1 to about 30 minutes or, if necessary, can be oven vulcanized at a temperature of about 150° to about 200° C.

The present modified acrylic rubber is distinguished in not only molding characteristics, but also normal state physical properties, particularly strength at break and elongation at break of the vulcanization product, as compared with graft copolymers using an organic solvent. Furthermore, the present modified acrylic rubber is also distinguished in production cost because no organic solvent is used.

PREFERRED EMBODIMENTS OF THE INVENTION

The present invention will be described in detail below, referring to Examples.

EXAMPLE 1

(Roll Method)

200g of a terpolymer of ethyl acrylate/n-butyl acrylate/vinyl chloroacetate in a ratio of 49:49:2 by weight (Copolymer A) was wound up at a 4-inch open roll preheated to 125° C. and subjected to conduct mastication for one minute, and then the following compounds were added and subjected to intimate kneading for ten minutes to conduct modification reaction:

| | |
|---|---|
| 2-Acryloyloxyethyl succinate (HOA-MS, trademark of a product commercially available from Kyoeisha Chemical Co., Ltd. Japan) | 3 g (1.5 parts by weight) |
| Potassium stearate | 4 g (2 parts by weight) |
| Benzyltriphenylphosphonium chloride [BTPPC] | 1 g (0.5 parts by weight) | where parts by weight in parentheses are per 100 parts by weight of Copolymer A.

The discharged modified rubber was cooled at room temperature overnight. Then, an acrylic rubber composition was prepared by kneading the following compounds with an 8-inch open roll:

| | | |
|---|---|---|
| Modified rubber | 100 parts by weight | |
| Stearic acid | 1 | " |

| -continued | | |
|---|---|---|
| 4,4'-Bis(α,α-dimethylbenzyl)diphenylamine (Nocrac CD, trademark of a product commercially available from Ouchi Shinko Chemical Industrial Co., Ltd. Japan) | 2 | " |
| FEF carbon black | 60 | " |
| α,α'-Bis(t-butylperoxy)diisopropylbenzene (60% product: Peroxymon F40, trademark of a product commercially available from NOF Corporation, Japan) | 2 | " |

(60% product; Peroxymon F40, trademark of a product commercially available from NOF Corporation, Japan)

The resulting composition was press vulcanized at 180° C. for 5 minutes.

EXAMPLE 2

(Banbury Mixer Method)

2.9 Kg (100 parts by weight) of Copolymer A was charged into a 3.6-L Banbury mixer whose inside was preheated to 150° C. with steam and subjected to conduct mastication for one minute and then 43.5 g (1.5 parts by weight) of HOA-MS, 58 g (2 parts by weight) of potassium stearate and 14.5 g (0.5 parts by weight) of BTPPC were charged thereto, followed by intimate kneading for 5 minutes to conduct modification reaction.

Discharged modified rubber was cooled at room temperature overnight and then an acrylic rubber composition was prepared and vulcanized in the same manner as in Example 1.

EXAMPLE 3

In Example 2, the amount of the organic peroxide was changed to 3 parts by weight when the composition was prepared.

EXAMPLE 4

In Example 2, one part by weight of triallyl isocyanurate (60% product) was further added when the composition was prepared.

EXAMPLE 5

In Example 2, the amount of HOA-MS was changed to 3 parts by weight and 0.5 parts by weight of phenothiazine was further added when the modification reaction was carried out.

EXAMPLE 6

In Example 2, a quaternary copolymer of ethyl acrylate/n-butyl acrylate/2-methoxyethyl acrylate/vinyl chloroacetate in a ratio of 10:58:30:2 by weight (Copolymer B) was used in place of Copolymer A and the amount of the organic peroxide was changed to 1.2 parts by weight when the composition was prepared.

EXAMPLE 7

In Example 6, 0.5 parts by weight of trimethylolpropane trimethacrylate was further added when the composition was prepared.

EXAMPLE 8

In Example 5, Copolymer B was used in place of Copolymer A and 2 parts by weight of p-carboxyphenylene maleimide (PAB-MI, trademark of a product commercially available from Mitsui Kagaku K. K., Japan) was used in place of HOA-MS, when the modification reaction was carried out.

EXAMPLE 9

In Example 2, a terpolymer of ethyl acrylate/n-butyl acrylate/monobutyl maleate in a ratio of 49:49:2 by weight was used in place of Copolymer A, and 3 parts by weight of allylamine (Aldrich's reagent), 1.5 parts by weight of di-o-tolylguanidine (Nocceler DT, trademark of a product commercially available from Ouchi Shinko Chemical Industrial Co., Ltd. Japan) and 1.5 parts by weight of phenothiazine were used per 100 parts by weight of the acrylic rubber when the medication reaction was carried out.

EXAMPLE 10

In Example 2, a terpolymer of ethyl acrylate/n-butyl acrylate/glycidyl methacrylate in a ratio of 49:49:2 by weight was used in place of Copolymer A, and 2 parts by weight of 4-nitrophenyl methacrylate, synthesized from n-nitrophenol and methacrylic acid chloride, and 1.5 parts by weight of tetrabutylammonium bromide were used per 100 parts by weight of the acrylic rubber, when the modification reaction was carried out.

EXAMPLE 11

In Example 2, a terpolymer of ethyl acrylate/n-butyl acrylate/4-cyanophenyl acrylate in a ratio of 49:49:2 by weight was used in place of Copolymer A, and 2 parts by weight of allyl glycidyl ether and 1.5 parts by weight of tetrabutylammonium bromide were used per 100 parts by weight of the acrylic rubber, when the modification reaction was carried out. 4-cyanophenyl acrylate as a comonomer for the terpolymer was synthesized from p-cyanophenol and acrylic acid chloride.

The compositions prepared according to the foregoing Examples 1 to 11 were subjected to determination of molding characteristics, i. e. to 90 values (time required until 90% of maximum crosslinking torque is reached, where a shorter time shows that the molding can be made for a shorter time) and T10 values (torque values 10 minutes after the measurement, where a higher torque value shows a better molding state) at 180° C., using a JSR curastometer Type V.

The vulcanized products obtained from the compositions were subjected to determination of normal state physical properties and compression set (25% compression at 150° C. for 70 hours) according to JIS K-6301.

The results are shown in the following Table 1.

TABLE 1

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| [Molding characteristics] | | | | | | | | | | | |
| tc90 (min.) | 3.4 | 3.2 | 2.8 | 3.5 | 2.8 | 4.0 | 4.0 | 3.3 | 8.9 | 4.1 | 3.2 |
| T10 (Kg · cm) | 6.8 | 7.2 | 8.0 | 7.6 | 7.4 | 5.3 | 5.6 | 8.1 | 4.5 | 3.4 | 4.1 |
| [Normal state physical properties] | | | | | | | | | | | |
| Hardness (JIS A) | 53 | 55 | 60 | 56 | 56 | 50 | 50 | 63 | 51 | 44 | 42 |
| 100% Modulus (MPa) | 3.5 | 4.0 | 4.5 | 4.2 | 4.1 | 2.1 | 3.1 | 6.4 | 4.2 | 1.8 | 1.4 |
| Strength at break (MPa) | 12.1 | 12.0 | 11.1 | 11.8 | 12.5 | 11.4 | 10.9 | 10.5 | 8.9 | 9.2 | 8.8 |
| Elongation at break (%) | 230 | 200 | 160 | 200 | 180 | 320 | 240 | 160 | 300 | 340 | 350 |
| [Compression set] | | | | | | | | | | | |
| JIS-Block (%) | 27 | 25 | 30 | 27 | 28 | 51 | 40 | 25 | 53 | 60 | 60 |
| O-ring (%) | 31 | 30 | 38 | 32 | 33 | 50 | 61 | 33 | 47 | 66 | 54 |

EXAMPLE 12

100 parts by weight of an ethylene/methyl acrylate copolymer containing epoxy groups (Esplene EMA 2752, trademark of a product commercially available from Sumitomo Chemical Co., Ltd, Japan) was wound up at a 4-inch open roll preheated to 125° C. and subjected to conduct matiscation for one minute, and then 2 parts by weight of p-nitrophenyl methacrylate and 1.5 parts by weight of tetrabutylammonium bromide were added thereto and subjected to intimate kneading for 10 minutes to conduct modification reaction.

Discharged modified rubber was cooled at room temperature overnight, and preparation of an acrylic rubber composition and press vulcanization of the composition were carried out in the same manner as in Example 1.

EXAMPLE 13

100 parts by weight of an ethylene/methyl acrylate copolymer containing carboxyl groups (Vamac G, trademark of a product commercially available from DuPont, USA) was wound up at a 4-inch open roll preheated to 125° C. and subjected to conduct mastication for one minute, and then 3 parts by weight of allylamine and 1.5 parts by weight of di-o-tolylguanidine were added thereto and subjected to intimate kneading for 10 minutes to conduct modification reaction.

Discharged modified rubber was cooled at room temperature overnight, and then preparation of an acrylic rubber composition and press vulcanization of the composition were carried out in the same manner as in Example 1.

The compositions prepared according to the foregoing Examples 12 and 13 were subjected to determination of molding characteristics and the vulcanization products of the compositions were subjected to determination of normal state physical properties and compression set. The results are shown in the following Table 2.

TABLE 2

| Example No. | | 12 | 13 |
|---|---|---|---|
| [Molding characteristics] | | | |
| tc90 | (min.) | 4.4 | 9.2 |
| T10 | (Kg·cm) | 3.3 | 3.6 |
| [Normal state physical properties] | | | |
| Hardness | (JIS A) | 44 | 45 |
| 100% Modulus | (MPa) | 1.5 | 2.1 |
| Strength at break | (MPa) | 8.9 | 8.1 |
| Elongation at break | (%) | 420 | 360 |
| [Compression set] | | | |
| JIS-Block | (%) | 63 | 60 |
| O-ring | (%) | 58 | 62 |

Comparative Example 1

(Solution Method)

250g (100 parts by weight) of Polymer A and 6 L of toluene were charged into a separable flask having capacity of 10 L, provided with a stirrer and a cooling tube, and stirred at 40° C. over 24 hours to make solution. After the inside temperature was elevated to 80° C., 50 g of an aqueous 5 wt. % potassium hydroxide solution was added thereto. After the stabilization of the inside temperature, 20 g of a 20 wt. % HOA-MS solution in toluene (1.6 parts by weight as HOA-MS) was added thereto over one hour, followed by further stirring for 3 hours. After cooling, the modification reaction solution was neutralized with an aqueous 2.5 wt. % sodium carbonate solution and washed with water and toluene was removed therefrom by distillation, whereby modified rubber was recovered therefrom. The recovered rubber was washed again with water and dried in an oven at 70° C. for 12 hours, whereby 220 g of modified rubber was obtained.

The modified rubber was prepared into an acrylic rubber composition and vulcanization of the composition was carried out in the same manner as in Example 1.

Comparative Example 2

The following compounds were added to 100 parts by weight of a terpolymer of ethyl acrylate/n-butyl acrylate/2-methoxyethyl acrylate in a ratio of 10:60:30 by weight:

| Stearic acid | 1 part by weight |
|---|---|
| Nocrac CD | 2 " |
| FEF carbon black | 60 " |
| Organic peroxide (Peroxymon F40) | 1.3 " |
| N,N'-m-phenylene dimaleimide (Vulnoc PM, trademark of a product commercially available from Ouchi Shinko Chemical Industrial Co., Ltd. Japan) | 6 " |

The mixture was kneaded with an open roll, and the resulting acrylic rubber composition was press vulcanized at 180° C. for 5 minutes.

Comparative Example 3

The following compounds were added to 100 parts by weight of a terpolymer of ethyl acrylate/n-butyl acrylate/allyl methacrylate in a ratio of 50:49.5:0.5 by weight:

| Stearic acid | 1 part by weight |
|---|---|
| Nocrac CD | 2 " |
| FEF carbon black | 60 " |
| Organic peroxide (Peroximon F40) | 3 " |

The mixture was kneaded with an open roll, and the resulting composition was press vulcanized at 180° C. for 5 minutes.

Comparative Example 4

The following compounds were added to 100 parts by weight of a terpolymer of ethyl acrylate/n-butyl acrylate/cyclohexenyl methacrylate in a ratio of 49:49:2 by weight:

| stearic acid | 1 part by weight |
|---|---|
| Nocrac CD | 2 " |
| FEF carbon black | 60 " |
| Organic peroxide (Peroximon F40) | 2 " |

The mixture was kneaded with an open roll, and the resulting acrylic rubber mixture was press vulcanized at 180° C. for 5 minutes.

Results of determinations carried out in the same manner as in the foregoing Examples 1 to 13 are shown in the following Table 3.

TABLE 3

| Comp. Ex. No. | | 1 | 2 | 3 | 4 |
|---|---|---|---|---|---|
| [Molding characteristics] | | | | | |
| tc90 | (min.) | 4.4 | 4.5 | 0.5 | 1.8 |
| T10 | (Kg·cm) | 5.1 | 5.6 | 2.3 | 3.1 |
| [Normal state physical properties] | | | | | |
| Hardness | (JIS A) | 45 | 54 | 45 | 46 |
| 100% Modulus | (MPa) | 2.2 | 2.4 | 1.2 | 2.1 |
| Strength at break | (MPa) | 3.8 | 11.6 | 5.0 | 3.3 |
| Elongation at break | (%) | 460 | 360 | 360 | 420 |
| [Compression set] | | | | | |
| JIS-Block | (%) | 63 | 39 | 70 | 65 |
| O-ring | (%) | 72 | 65 | 28 | 34 |

Comparative Example 5

The following compounds were kneaded with an open roll:

| Copolymer A | 100 parts by weight |
|---|---|
| Stearic acid | 1 " |
| Nocrac CDc | 2 " |
| FEF carbon black | 60 " |
| Organic peroxide (Peroxymon F40) | 2 " |

The resulting acrylic rubber composition was subjected to press vulcanization at 180° C. for 5 minutes with failure to vulcanize.

Comparative Example 6

In Comparative Example 5, the acrylic rubber composition was further admixed with 1.5 parts by weight of HOA-MS, 2 parts by weight of potassium stearate and 0.5 parts by weight of butyltriphenylphosphonium chloride and subjected to the press vulcanization also with failure to vulcanize.

The foregoing results show that:

(1) Modified rubber obtained by Solution Method (Comparative Example 1) requires a long time in the crosslinking and has poor molding characteristics, as compared with the present modified rubber.

(2) Modified rubber obtained using the known maleimide crosslinking aid and organic peroxide at the same time (Comparative Example 2) has a poor O-ring compression set characteristic.

(3) Acrylic rubbers obtained by copolymerization of dienic monomers (Comparative Examples 3 and 4) have poor molding characteristics, particularly as to T10 values.

(4) Addition only of a peroxide to an acrylic rubber having active chlorine groups (Comparative Example 5) fails to produce any crosslinked product.

(5) In case of simple mixing of an acrylic rubber having active chlorine groups with an unsaturated compound having a carboxyl group and a catalyst (metal stearate-quaternary onium salt), no crosslinking with an organic peroxide occurs.

(6) The present modified rubbers, on the other hand, enable peroxide crosslinking due to the unsaturated groups introduced into the acrylic rubbers.

What is claimed is:

1. A process for producing a peroxide-curable, modified acrylic rubber, which comprises mixing an acrylic rubber having active chlorine groups with an unsaturated compound having a carboxyl group with heating in the absence of a solvent.

2. A process according to claim 1, wherein the reaction of the acrylic rubber having active chlorine groups with the unsaturated compound having a carboxyl group is carried out in the presence of an acid acceptor and a quaternary onium salt and in the absence of a solvent.

3. A process according to claim 1, wherein the mixing with heating is carried out with an open roll.

4. A process according to claim 1, wherein the mixing with heating is carried out with an enclosed kneader.

5. A process according to claim 1, wherein the mixing with heating is carried out with an extruder.

6. A process according to claim 1, wherein the acrylic rubber having reactive functional groups is charged into or wound up at a kneader preheated to about 50° to about 200° C. to conduct mastication, and then the unsaturated compound reactive with the reactive functional group and the catalyst are added thereto to conduct intimate kneading.

* * * * *